No. 12,290. REISSUED NOV. 29, 1904.

H. A. DODGE.

MATCH BOX.

APPLICATION FILED MAR. 8, 1904.

WITNESSES:

G. S. Kingsbury

J. H. Kark

INVENTOR

Harold A. Dodge

BY

Griffin, Bernhard & Cavanagh.

ATTORNEYS

No. 12,290. Reissued November 29, 1904.

UNITED STATES PATENT OFFICE.

HAROLD A. DODGE, OF ELIZABETH, NEW JERSEY.

MATCH-BOX.

SPECIFICATION forming part of Reissued Letters Patent No. 12,290, dated November 29, 1904.

Original No. 749,539, dated January 12, 1904. Application for reissue filed March 8, 1904. Serial No. 197,200.

*To all whom it may concern:*

Be it known that I, HAROLD A. DODGE, a citizen of the United States, residing at Elizabeth, in the county of Union and State of New Jersey, have invented certain new and useful Improvements in Match-Boxes, of which the following is a specification, reference being had therein to the accompanying drawings.

This invention has for its object to provide a match-box more especially adapted to receive small packages of safety-matches made of cardboard and such as have been in extensive use for advertising purposes, the advertisements being usually printed on the matches themselves.

My improved match-box is of such form that it is well adapted for advertising purposes, in that the advertisements may be placed or embossed in any suitable manner on the back and the lid thereof, and the match-box is of such convenient and attractive form as to render it desirable to be retained permanently by the user and to be refilled by the packages of matches as often as the latter become exhausted.

Figure 1:
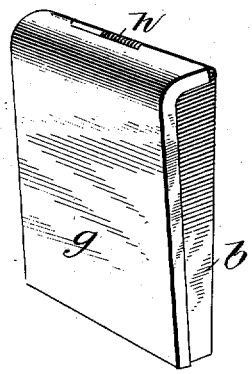
Figure 2:
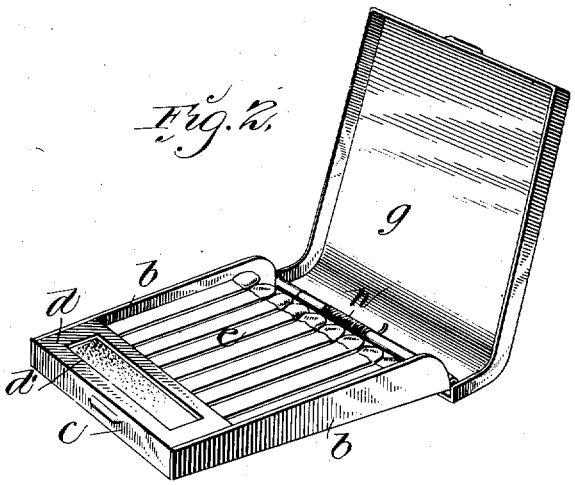
Figure 3:
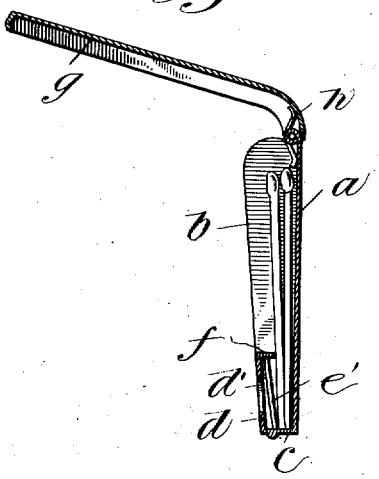

In the accompanying drawings, Figure 1 is a perspective view of the improved match-box in a closed condition. Fig. 2 is a perspective view of the same open and with a package of matches therein. Fig. 3 is a longitudinal section of the improved match-box with a package of matches therein.

The improved match-box is preferably made of flexible sheet metal of any suitable kind, as brass, tin, copper, or aluminium, the latter metal being preferred for lightness and attractiveness. The body portion of the box comprises a back portion *a*, turned-up side lips *b*, a turned-up end lip *c*, integral with which latter is a holding-piece *d*, turned over so as to partly overlie the package of matches *e*, and which holding-piece *d* may be provided with an inturned lip *f*, arranged to engage a cardboard portion *e'*, forming part of the match-package, and which package is in practice provided with friction material suitable for scratching matches thereon for the purpose of igniting them. To permit of convenient access to this friction material, the holding-piece *d* is provided with an opening *d'*. The holding-piece *d* or, as it may be designated, the "match-retaining means," is adapted for engagement with the match-package. The lip or flange *f* is also adapted for engagement with the package in order to serve the function of a breaker to assist in detaching the individual matches from the comb or package.

The body portion of the box, comprising the back, turned-up lids or sides, the end piece, and the holding-piece, preferably consists of a single piece of metal cut to proper shape and bent into the form shown in the drawings. The side pieces or lips *b* are preferably tapered, so as to be somewhat wider at their ends adjacent to the part of the box to which the lid *g* is hinged than at their opposite ends, so as to make the box thicker and deeper at the end thereof where the heads of the matches will come, as the packages of matches of the kind intended for reception by the box are somewhat thicker at the headed ends of the matches than at their opposite ends. The hinge of the lid is preferably provided with a spring *h*, which will tend to open the lid when the same is released from a holding catch or lug *i*, stamped up from the sheet metal in a well-known manner.

The turned-over holding-piece *d* is not attached at the sides of the box and is sufficiently flexible, so that the packages of matches may be readily inserted beneath the same, and in breaking off the paper matches the said holding-piece may be pressed by the thumb of the user against the matches and will thus serve as a breaker against which the matches may be pulled in removing them separately from the package.

In the packages of paper matches as now usually placed on the market the ends of the matches are attached to a common base-strip, while the opposite ends—the ends provided with the ignitible material—are free; but on account of the space occupied by the heads of the matches the said free ends occupy a larger space than the attached ends. There is thus formed a match-comb of substantially wedge shape, and my improved box is especially adapted for the reception of such a package. Furthermore, my match-retaining means holds such package securely in place and in such manner that when the pivoted cover is swung open the matches are exposed to ready access through the open side thus provided and permitting of the detaching of individual matches from the common base-strip. It will further be noted that the match-retaining means coöperate with the tapering sides in such manner that the accidental and unintentional displacement of the match-comb is prevented.

Another advantage incident to my improved box is that after the matches have been detached from the base-strip the latter may be readily disengaged from the retaining means and a new comb or package inserted.

From the foregoing it will be understood that the invention provides a cheap and convenient match-box suitable for advertising purposes and adapted for the reception of packages of paper matches, such as are now extensively in use, and also provide the convenient means whereby the matches may be removed separately from the packages and readily and conveniently ignited on the usual friction-surfaces of the packages through the opening in the holding-piece *d*.

What I claim is—

1. A match-box comprising a back having turned-up lips to afford side and end portions for the body of the box, and having integral with the end portion a turned-over holding-piece to partly overlie a package of matches, said holding-piece having its central portion open to provide an aperture through which the matches may be ignited on the friction material of the package, and said box being provided with a suitable hinged lid.

2. A match-box provided with a hinged lid at one end and being formed deeper at the end where the lid is hinged than at its opposite end, so as to hold a package of paper matches, and the said box having, at its end opposite the hinge of the lid, a holding-piece, as *d*, to partly overlie a package of matches contained in the box, said holding-piece having its central portion cut away to provide an opening through which the matches may be ignited on the friction material of the package.

3. A match-box comprising a back having turned-up lips at its sides and one end, said sides being tapered toward said end whereby the box is made deeper at one end than at the other, a cover pivoted at the deeper end to cover said end and the top of the box, and match retaining and engaging means.

4. A match-box of substantially wedge shape having a back with one end member and two side members rigidly attached thereto, the front of said box being open substantially its entire length, means within the box and near the smaller end thereof for engaging and retaining a package of matches, and a pivoted cover for covering the larger end of the box and also the open face thereof whereby when the cover is opened the package of matches is exposed and individual matches may be detached therefrom.

5. A match-box having a solid back, a turned-up end member rigid therewith, two side members also rigid with said back, substantially the entire front of said box being open, a match retaining and engaging flange arranged near one end of the box to hold a package of matches exposed to view through the open front, and a cover pivoted to the box and arranged to cover the open front.

6. A match-box larger at one end than the other, means within the box for engaging and retaining therein a package or comb of matches, an open front to the box whereby the matches are accessible for their entire length and may be detached from the base of the comb without disturbing the same, and a cover for the open front overlying the matches and the match engaging and retaining means.

7. A match-box provided with a hinged cover at one end, said box being deeper at the end where the cover is hinged than at its opposite end, an open front to the box, means near the shallow end of the box for engaging and retaining a comb of matches, whereby substantially the entire comb of matches may be detached therefrom.

8. A match-box of substantially wedge shape having the back, the side members and the end piece near the shallow end thereof and match engaging and retaining means near said end and all integral, an open front for the box, and a cover pivoted at the larger end of the box and covering the open front and the match engaging and retaining means.

9. A match-box formed deeper at one end than at the other, and having a back piece, and end piece and two side members integral therewith, match engaging and retaining means arranged near the relatively shallow end of the box and adapted to hold a package of matches, and a pivoted cover arranged to cover the end of the box opposite the match engaging and retaining means and also the front of the box, the structure forming an inclosure for a package of matches and permitting the detachment of individual matches without disturbing the package.

10. A match-box provided with a back, and end member and two side members rigid and integral with said back, substantially the entire front of said box being open, a cover hinged near one end of the box, and means near the end of the box opposite the cover-hinge for engaging and retaining a comb of matches, whereby the entire comb of matches is exposed when the cover is opened and individual matches may be detached without disturbing the comb.

HAROLD A. DODGE.

Witnesses:
R. B. CAVANAGH,
H. C. FIANTO.